United States Patent [19]

Andry et al.

[11] 4,302,769
[45] Nov. 24, 1981

[54] TRICHROMATIC BEAM SPLITTER

[75] Inventors: Louis L. Andry; Michael C. Hoover, both of Houston, Tex.

[73] Assignee: Geosource Inc., Houston, Tex.

[21] Appl. No.: 43,672

[22] Filed: May 30, 1979

[51] Int. Cl.³ ............................................. H04N 9/09
[52] U.S. Cl. ..................................................... 358/55
[58] Field of Search ................. 350/171, 173; 358/55, 358/229

[56] References Cited

U.S. PATENT DOCUMENTS

| 2,642,487 | 6/1953 | Schroeder | 350/171 |
| 2,889,735 | 6/1959 | Wieberdink | 350/171 |
| 3,303,278 | 2/1967 | Beno et al. | 350/171 |

Primary Examiner—Jon W. Henry
Attorney, Agent, or Firm—Arnold, White & Durkee

[57] ABSTRACT

An optics arrangement utilizing a trifurcating beam splitter is characterized by a first half-silvered element disposed at a 45° angle with respect to the axis of an incident light beam. Second and third half-silvered elements are each disposed perpendicular to opposed surfaces of the first element and cooperate such that the light energy incident thereon is trifurcated into three ray paths each mutually perpendicular to the other, one of the ray paths having an axis coincident with the axis of the incident light beam. The invention is particularly useful in connection with a color video transmitting arrangement for a color sorting apparatus whereby incident light energy focused by a lens is trifurcated into mutually orthogonal ray paths having a visual image plane therewithin, the focal length between each visual image plane and the lens being substantially equal.

5 Claims, 5 Drawing Figures

TRICHROMATIC BEAM SPLITTER

CROSS REFERENCE TO RELATED APPLICATION

Subject matter disclosed herein is disclosed in co-pending application Ser. No. 043,694 entitled Roll Sorting Apparatus, filed contemporaneously herewith and assigned to the assignee of the present invention.

BACKGROUND OF THE INVENTION

1. Field of the Invention

This invention relates to a trichromatic beam splitting arrangement adapted to direct light energy incident thereon into three mutually orthogonal ray paths.

2. Description of the Prior Art

In video transmission systems, and particularly in portable color television transmitting equipment, each video camera has a beam splitter arrangement disposed therein which is adapted to trifurcate light incident thereon into three ray paths.

Typically, the incident light energy impinges upon a lens element disposed perpendicularly to the axis of the incident beam. The light is focused by the lens and is passed through a bifurcating beam splitter disposed behind the lens. The bifurcating beam splitter splits the focused light energy into a first and a second ray path, the first ray path being directed toward the first of a plurality of vidicon tubes disposed in a bank of tubes. The axis of each tube in the bank is usually disposed perpendicularly to the axis of the incident light beam and parallel to each other.

Disposed directly behind the first beam splitter is a reflecting mirror operative to direct light in the second ray path toward a second beam splitter element. The second beam splitter is operative to bifurcate the light incident thereon into a first and a second ray path, one of the ray paths being directed toward a second vidicon tube while the second ray path from the second beam splitter is reflected by a second mirror and directed toward the third vidicon tube.

It is apparent that the vidicon tubes are each disposed a different focal length from the lens. Accordingly, it is necessary to provide some compensating lensing arrangement in the first and second ray paths from the second beam splitter in order to provide focused images to each of the vidicon tubes. In some arrangements the compensating lenses are embodied in a combined lens-filter arrangement. In the prior art portable television cameras require sophisticated compensating lensing arrangements as well as precision housings so that each of the vidicon tubes may be disposed at precisely the correct focal length from the lens.

It would be advantageous to provide an optical arrangement whereby light incident on a lens may be presented to three visual image planes each substantially the same focal length from the lens. Such an arrangement would appear to eliminate the need for complementary lensing arrangements and also simplify the mechanical mounting requirements of the housing.

SUMMARY OF THE INVENTION

This invention relates to an optical arrangement adapted to direct light energy focused by a lens onto three mutually orthogonal visual image planes, such as those defined by the target faces of vidicon tubes.

The optical arrangement includes a beam splitter adapted to split an incident light beam impinging upon the lens along a given optical axis and directing that beam into three ray paths. The axis of one of the ray paths is coincident with or parallel to the axis of the incident beam. The axes of the other two ray paths are orthogonal to each other and to the axis of the incident beam.

The beam splitter comprises at least two reflecting/transmitting surfaces disposed at a predetermined angle with respect to each other. The surfaces are each adapted to transmit a predetermined portion of light energy incident thereon in a predetermined wavelength range while reflecting light energy in another predetermined range. The result is the trifurcation of light into three mutually orthogonal ray paths, each containing light in only predetermined wavelength bands.

In one embodiment of the invention the beam splitter comprises a first half-silvered element having first and second opposed surfaces thereon. The first element is disposed at a 45° angle with respect to the axis of the incident light beam. A second and a third half-silvered elements are respectively disposed perpendicularly to one of the opposed surfaces of the first element. The elements cooperate such that a portion of the light energy incident thereon from the lens is passed through the elements onto a first ray path coincident with the axis of the incident light energy. Further, the elements are arranged such that a portion of the incident light energy is also reflected along opposed ray paths the axes of which are each perpendicular to the axis of the incident beam and to the axis of the first ray path.

BRIEF DESCRIPTION OF THE DRAWINGS

The invention will be more fully understood from the following detailed description thereof taken in connection with the accompanying drawings, which form a part of this application and in which.

DESCRIPTION OF THE PREFERRED EMBODIMENT

Throughout the following description, similar reference numerals refer to similar elements in all Figures of the drawings.

Figure 1:
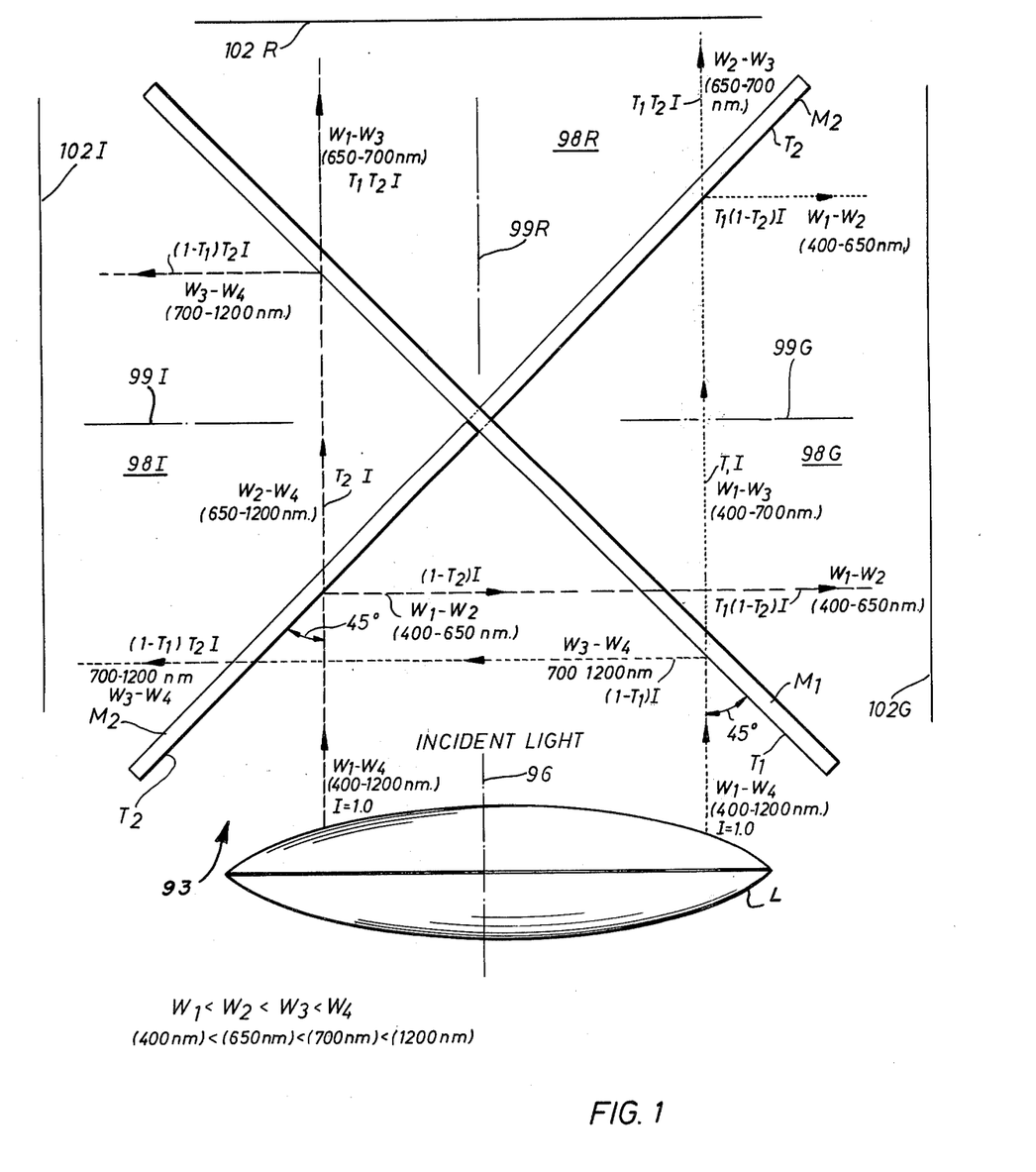
FIG. 1 is a schematic diagram indicating the operation of the beam splitter in accordance with the instant invention.

FIG. 1 is a schematic diagram of the operation of the instant invention. The beam splitter arrangement 93 is generally depicted as including two reflecting/transmitting mirror elements $M_1$ and $M_2$ each cooperating to define a cruciform arrangement as viewed from the end thereof. As will be discussed herein, the beam splitter 93 is particularly useful in connection with an optics module for a sorting apparatus wherein sorting occurs through the analysis of the video signals generated from vidicon tubes. However, it is to be understood that the invention has utility in other areas, such as in the optics associated with color television broadcasting.

As seen in FIG. 1, a lens arrangement generally indicated at L is operative to direct light energy incident thereon toward the beam splitter arrangement 93 disposed therebehind. It is the object of this invention to generate, from the focused beam incident upon the beam splitter 93, three way paths, each having an axis substantially orthogonal with respect to the other, one of which is substantially parallel to the axis 96 of the incident beam. The axis 96 applies to both the unfocused and focused portions of the incident light beam. It is understood, as discussed herein, that the lens L has a converging effect on the incident beam.

Typically, three visual image planes 102, such as the incident surfaces of the photosensitive targets of a vidicon tube, may be disposed within each resultant ray path.

The element $M_1$ of the beam splitter 93 is arranged at substantially a 45° angle of incidence to the light emerging from the lens. The element $M_1$ exhibits the physical characteristic such that light having wavelengths in a range $W_1$ through $W_3$ (as the range 400–700 nanometers) is transmitted therethrough while light having wavelengths in the range $W_3$ through $W_4$ (as the range 700–1200 nanometers) is reflected therefrom. If the element $M_1$ is arranged so that it defines a 45° angle with respect to the axis of the beam incident upon the lens L, the converging beam incident on the element $M_1$ will strike that element at substantially a 45° angle of incidence within a ±10° range.

The element $M_2$ of the beam splitter 93 is also arranged at substantially a 45° angle of incidence to the light emerging from the lens L. The element $M_2$ exhibits the characteristic such that light having wavelengths within the range $W_2$ through $W_4$ (as the range 650–1200 nanometers) is transmitted and light having wavelengths in the range $W_1$ through $W_2$ (as the range 400–650 nanometers) is reflected. Again, if the element $M_2$ is arranged at a 45° angle with the axis of the incident beam, the converging light incident of the beam splitter from the lens L will strike the element $M_2$ within an acceptable range (±10°) of incident angles to generate the desired result. Either of the elements $M_1$ or $M_2$ may be comprised of two sub-elements disposed perpendicularly to opposed surfaces of the other element.

The beam splitter 93 is operative such that three ray paths 98R, 98G and 98I, each having an axis 99 associated therewith, are generated. Reflected light within the range $W_1$ through $W_2$ (400–650 nanometers) is in the path 98G, transmitted light in the range $W_2$ through $W_3$ (650–700 nanometers) is in the path 98R, while reflected light in the range $W_3$ through $W_4$ (700–1200 nanometers) is in the path 98I. Of course, these reactions occur for any values of W, so long as $W_1 < W_2 < W_3 < W_4$. The axes 99 are substantially mutually orthogonal while one of the axes is substantially parallel to the axis 96 of the beam incident upon the lens L.

As a result of the operative effect of the beam splitter 93, light in the ray path 98R contains transmitted light within a range of ±25 nanometers around the wavelength 675 nanometers. Light in the ray path 98I contains reflected light having wavelengths in the range 700–1200 nanometers. Light in the ray path 98G contains reflected light in the wavelength range from 400–650 nanometers.

A beam splitter 93 in accordance with the instant invention may be physically configured in the form of a cube. This could be achieved by coating the appropriate sides of four right angle prisms and then fitting the prisms together. Alternatively, the element $M_1$ may be an integral planar element one surface of which is mirrored while the element $M_2$ may be subdivided into two sub-elements each disposed substantially perpendicularly to the opposite surface of the element $M_1$. As will be seen, the latter alternative is utilized in the description of the beam splitter utilized in the particular embodiment of the optics module utilizing the invention.

The interactions of the light incident on each element $M_1$ and $M_2$ is shown in FIG. 1 by dashed and dotted lines. The symbols $T_1$ and $T_2$ respectively define the transmissivity of each element $M_1$ and $M_2$. The element's transmissivity lies in a range between 0 and 1.0. The symbol I indicates the intensity of each incident beam.

Figure 2:
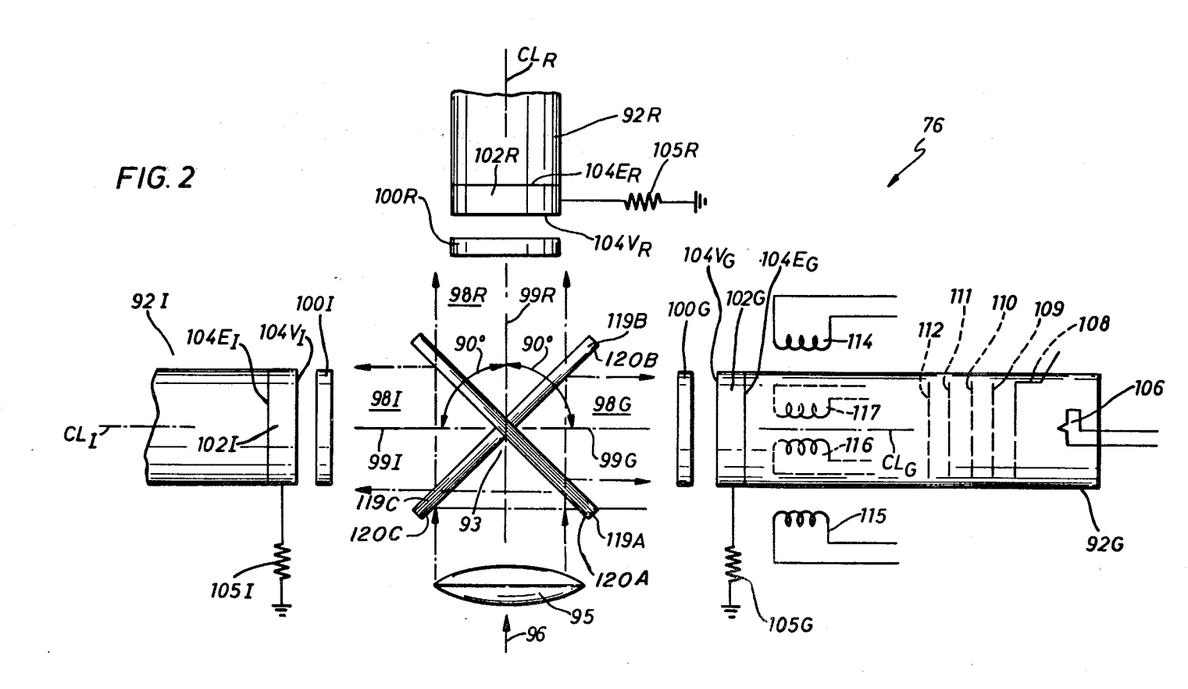
FIG. 2 is a highly stylized pictorial representation of an optics arrangement, or module, utilizing a trifurcating beam splitter in accordance with the instant invention; and, FIGS. 3A, 3B and 3C are, respectively, an end view, a top view and an enlarged view of the mechanical mounting structure of an optics module utilizing a beam splitter in accordance with the instant invention.
Figure 3A:
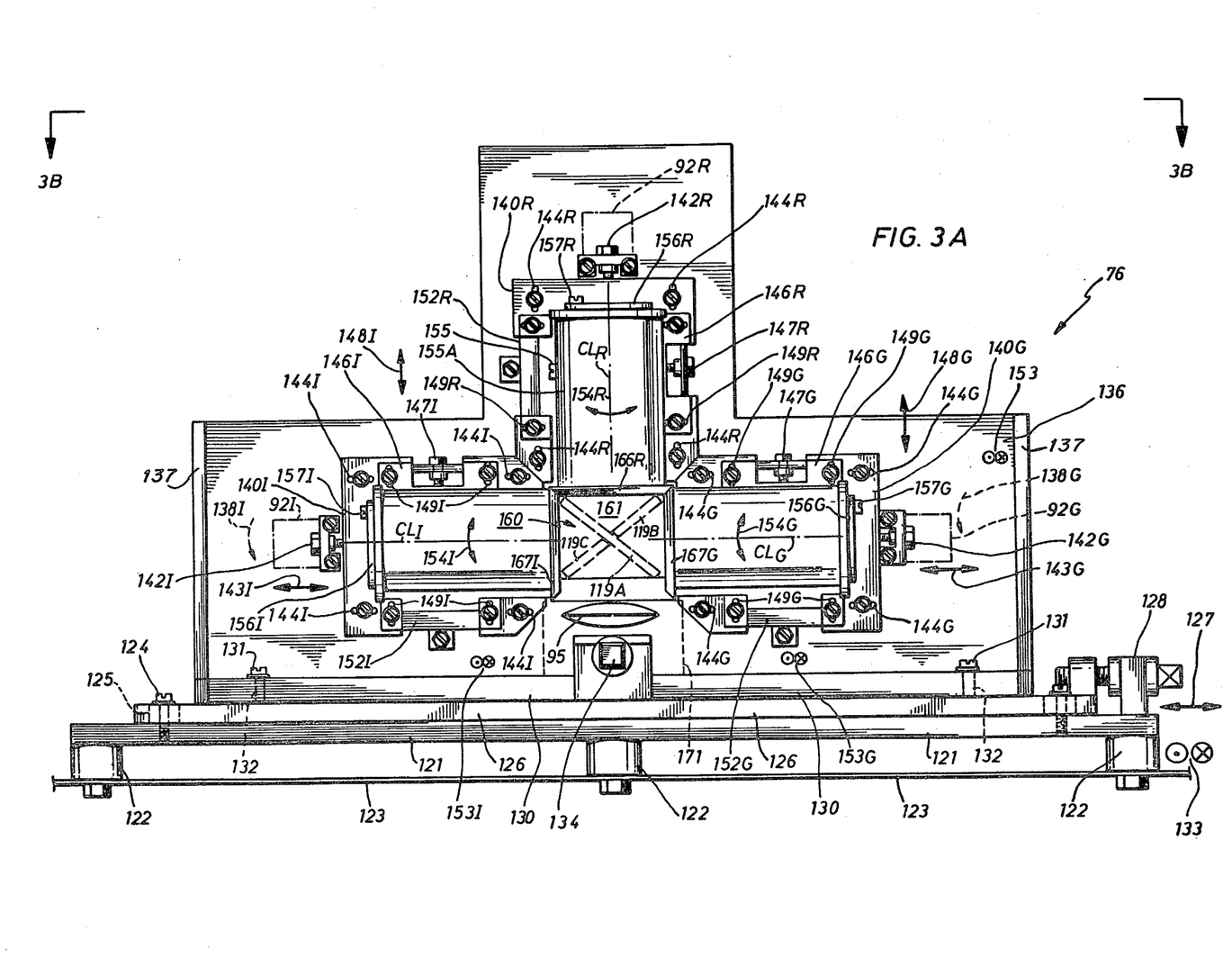
Figure 3B:
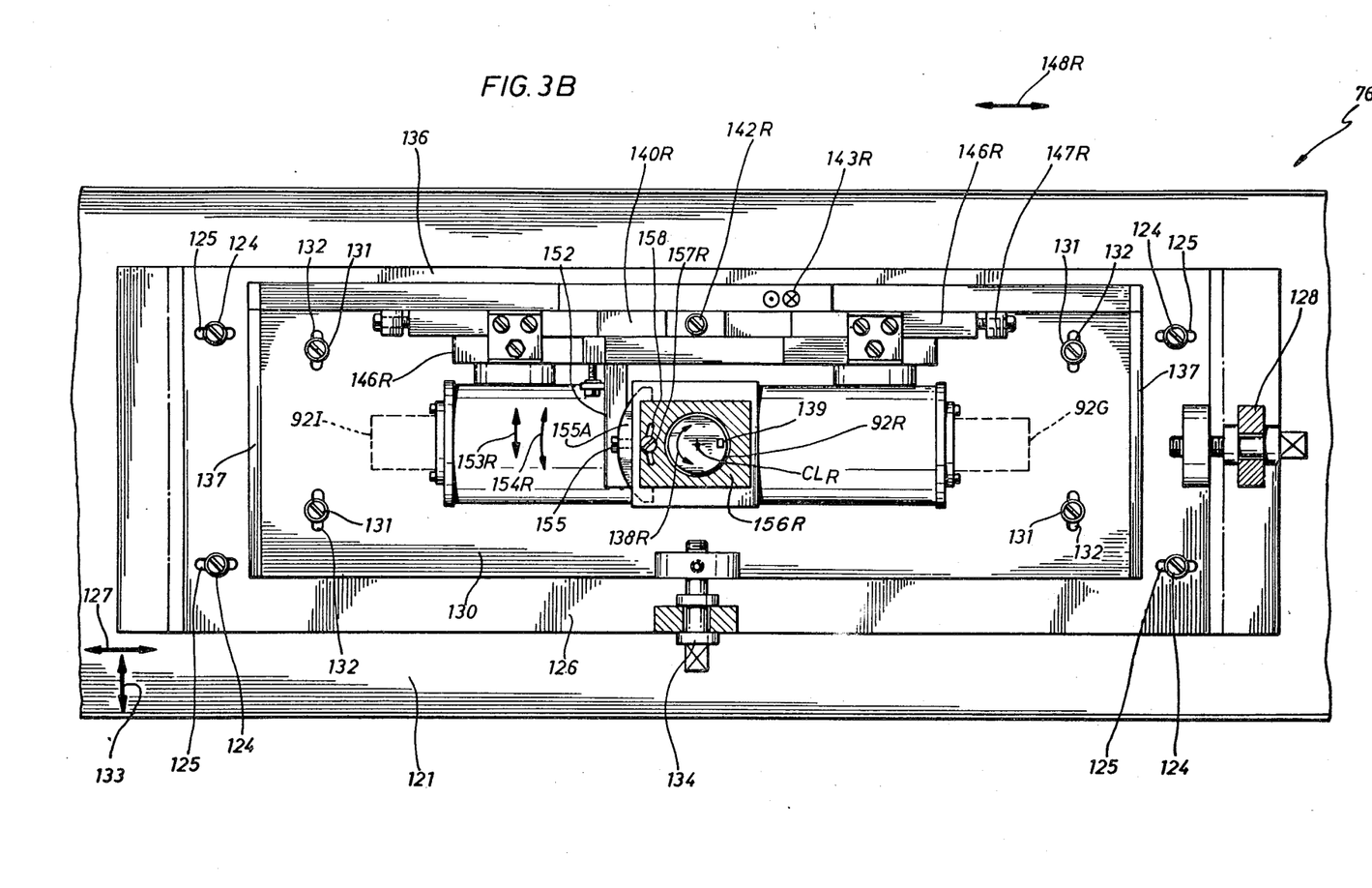
Figure 3C:
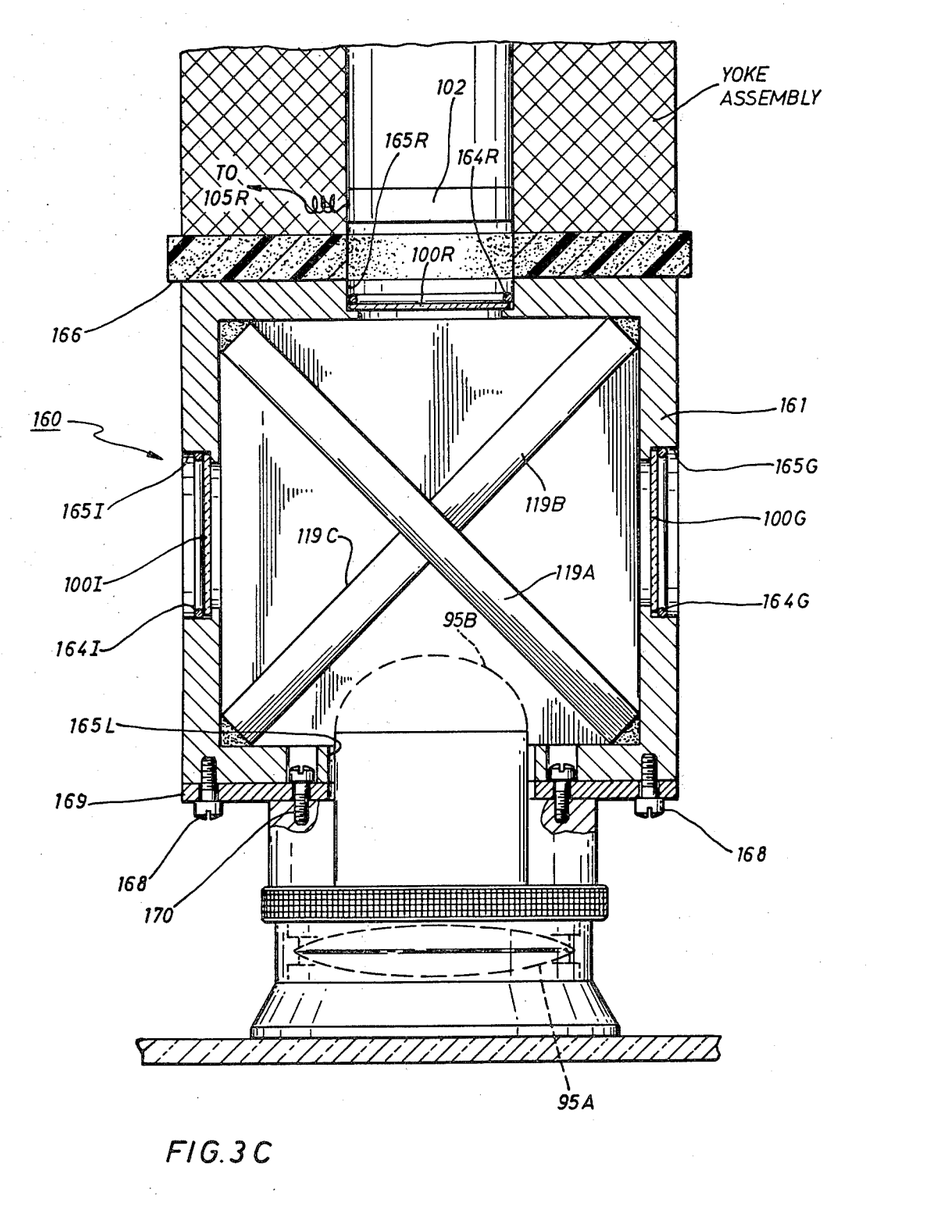

With reference to FIG. 2, shown is a highly stylized pictorial representation of the optics module 76 of a sorting apparatus in which the particular embodiment of beam splitter 93 may be disposed. The module includes the vidicon tubes 92 which may be used to define the image planes. FIGS. 3A, 3B and 3C are, respectively, end, top, and enlarged views of the mechanical support arrangements for the vidicon tubes 92 and the beam splitter arrangement 93.

Light is reflected from a viewed area and directed toward the optics module 76. The optics module 76 includes a twenty-four millimeter compound lens 95 such as that manufactured by Vivitar Corporation and sold under model number 37614841. The incident light beam (having an axis 96) is focused by the lens 95 and trifurcated by the beam splitter 93 into mutually orthogonal ray paths 98G, 98R and 98I, as discussed in connection with FIG. 1. An appropriate filter 100G (green), 100R (red), and 100I (infrared) may be respectively disposed in each ray path 98 intermediate the beam splitter 93 and the photosensitive target vidicon tube 92G (green), 92R (red) and 92I (infrared). Suitable for use as vidicon tubes 92 are those tubes manufactured by Panasonic Corporation and sold under model number S4076. Alternatively vidicons sold by RCA under model number 4532A may be used. Each of the vidicon tubes 92 is oriented along the axis 99 of the ray incident thereon such that the longitudinal centerline CL of the tubes 92 are also mutually perpendicular to each other. The targets 102 within each vidicon 92 are disposed equal focal lengths from the lens 95 as a result of the action of the beam splitter arrangement 93.

As seen in FIG. 2, the beam splitter arrangement 93 comprises three half-silvered elements 119A, 119B and 119C. The element 119A is inclined at a forty-five degree angle to the axis 96 of the focused incident beam and corresponds to the element $M_1$ in FIG. 1. The elements 119B and 119C are disposed perpendicularly to opposite surfaces of the element 119A and define sub-elements which cooperate to correspond to the element $M_2$. The interfaces between the elements do not adversely affect the images generated on the vidicon targets 102. The surfaces of each element 119 are silvered, as shown at 120.

The elements 119 are oriented with respect to incident light energy and to each other such that at each point on the silvered surfaces 120 thereof where an incident light beam strikes the mirrored surface, half of the light energy passes through the element while the remainder is reflected ninety degrees with respect to the original direction of the incident beam. The reactions of incident light beam on various faces of the elements 119 of the beam splitter 93 correspond to the reactions shown for the dotted and dashed beams of FIG. 1, with the transmissivities of each element equal to 0.5. The filter 100R is adapted to pass light in a range around 660 nanometers. The filter 100I is adapted to pass light in a range around 750 nanometers. The filter 100G is adapted to pass light in a range around 550 nanometers.

The net result of the beam splitter arrangement 93 is that light energy focused by the lens 95 is trifurcated into three ray paths 98 and directed (through the appropriate filters 100) onto the visual image planes 104V of each of the targets 102 of the vidicon tubes 92.

With reference to FIGS. 3A, 3B and 3C, an end view, a top view (along lines 3B—3B in FIG. 3A) and an enlarged view of the mechanical support arrangement for the optics module 76 is shown. The optics module includes a support base 121 mounted by suitable brackets 122 to the housing 123 or main optical case of the optics module 76. Mounted atop the base 121 through bolts 124 received in slots 125 (FIG. 3B) is a first support plate 126. The support plate 126 is adjustably moveable within the slots 125 in directions 127 (to the right and to the left in the plane of FIGS. 3A and 3B) through a threaded adjustment control 128.

The first support plate 126 itself carries a second support plate 130. The second plate 130 is attached through bolts 131 received in slots 132. The second support plate 130 is itself adjustably moveable with respect to the first support plate 126 in directions 133 (into and out of the plane of FIG. 3A and vertically in the plane of FIG. 3B) through the agency of a threaded adjustment control 134. Projecting upwardly from the second support plate 130 is a vidicon mounting plate 136 provided with braces 137 in order to secure the vidicon mounting plate 136 in position.

The yoke assembly for each of the vidicon tubes 92 is disposed within end mounting brackets 140, side mounting brackets 146 and under mounting brackets 152. The vidicon tubes 92 are themselves received within their associated yoke assemblies. As seen in FIG. 3B, each tube 92 is rotatable about its axial centerline CL in a direction corresponding to the direction 138R shown for the tube 92R. The tubes 92 are each inserted such that their index pins 139 (shown in FIG. 3B for the tube 92R) occupy a given angular orientation with respect to their centerline CL.

The end mounting brackets 140 are disposed at the ends of each of the yoke assemblies for each of the tubes 92 and are operable by threaded controls 142 to move the yoke assemblies in directions 143 (with respect to the centerline CL of each of the tubes 92) toward or away from a central housing 160 in slot 144.

The side mounting brackets 146 are disposed along the sides of each of the yoke assemblies and are operable by threaded controls 147 to move the yoke assemblies in directions 148 (with respect to the centerlines CL of each of the tubes 92) in slots 149. The under brackets 152 are disposed beneath each of the yoke assemblies to move the assemblies upwardly and downwardly with respect to the vidicon mounting plate 136 in directions 153.

The yoke assemblies are also rotatable in directions 154 with respect to the centerlines CL of the tubes with which they are associated. Gross adjustments are permitted to the yoke assemblies for each vidicon by the loosening of pins 155 and rotating the bracket 155A girding the yoke assemblies (see FIG. 3B). Fine adjustments are afforded by rotation of a plate 156 connected to the end of each yoke assembly about a pin 157 disposed in a curved slot 158. As a result of the above-described structure fourteen ranges of motion (in directions 127, 133, 138, 143, 148, 153 and 154) are available to assist in locating the image of the viewed area on the target 102 of the vidicon tubes 92.

As seen in the enlarged view of FIG. 3C, the central housing 160 includes a beam splitter block 161 having a recess therein, the ends of the recess having slots which receive the elements 119 of the beam splitter. The filters 100 are retained by springs 164 adjacent the apertures 165 to shield the targets of the vidicons 92 and to cushion movement of the vidicons toward the block 161.

Attached beneath the block 161 by screws 168 is the lens mounting 169. The casing of the lens 95 includes a rotatable depth adjustment and a diaphragm control as are well known in the art. The lens 95 is a compound lens having portions 95A and 95B (as suggested schematically by dot-dash lines). The lens is disposed adjacent the lower aperture 165L. The lens casing is secured to the mounting by screws 170.

Light reflected from the viewed area is gathered by the optics module 76 (which thus, in a sense, serves as a viewer arrangement), is focused by the lens 95, enters through the lower aperture 165L into the beam splitter 93, is trifurcated (as discussed in FIG. 1) and passes through apertures 165R, 165G and 165I in the ray paths 98 (as defined in FIG. 1) to impinge upon the visual image planes of the targets 102 of each of the vidicon tubes 92.

Having described a preferred embodiment of the invention, those skilled in the art may effect modifications thereto, all of which should be construed to be within the scope of this invention as defined by the appended claims.

What is claimed is:

1. An optics module for use with an apparatus for sorting articles by color, the sorting occurring through the analysis of video signals representative of light energy reflected from the articles being sorted as they pass through a viewed area, the video signals being generated by a plurality of vidicon tubes, comprising:

a lens disposed at a predetermined distance form the viewed area, the lens being adapted to focus reflected light energy incident thereon onto a photosensitive target of the vidicon tubes, the vidicon tubes being disposed at a substantially equal focal length from the lens; and a beam splitter arrangement disposed optically adjacent to the lens along the axis of the incident light energy, the beam splitter arrangement including first, second, and third elements, the first element having first and second opposed surfaces and being disposed at a 45° angle with respect to the axis of the incident light energy, the second and third elements each respectively disposed perpendicularly to one of the opposed surfaces of the first element, the first, second, and third elements cooperating such that a first portion of the incident light energy passes therethrough along a first ray path axis which is coincident with the axis of the incident light energy and second and third portions of the incident light energy are reflected along respective second and third opposed ray path axes which are each perpendicular to the axis of incident light energy;

the optics module further comprising:

a housing;

a support base mounted to the housing, the support base having a longitudinal axis extending parallel to the second and third ray path axes;

first support plate mounted atop the support base and adjustably moveable in a direction parallel to the longitudinal axis of the support base;

second support plate mounted atop the first support plate and adjustably moveable in a direction perpendicular to the longitudinal axis of the support base;

a vidicon mounting plate extending upward from and perpendicular to the second support plate; and a yoke assembly for receiving each vidicon tube, the yoke assemblies being mounted on the vidicon mounting plate such that each yoke assembly is adjustably moveable in three mutually orthogonal directions with respect to the vidicon mounting plate.

2. The optics module of claim 1, wherein the first element is adapted to transmit light energy in a range of wavelengths $W_1$ through $W_3$ and reflect light energy in a range of wavelengths $W_3$ through $W_4$, and wherein the second and third elements are each adapted to transmit light energy in a range of wavelengths $W_2$ through $W_4$ and reflect light energy in a range of wavelengths $W_1$ through $W_2$, where $W_1 < W_2 < W_3 < W_4$.

3. The optics module of claim 1, wherein the first element is adapted to transmit light energy in a range of wavelengths $W_2$ through $W_4$ and reflect light energy in a range of wavelengths $W_1$ through $W_2$, and wherein the second and third elements are each adapted to transmit light energy in a range of wavelengths $W_1$ through $W_3$ and reflect light energy in a range of wavelengths $W_3$ through $W_4$, where $W_1 < W_2 < W_3 < W_4$.

4. The optics module of claim 1, wherein the first, second, and third elements are each half-silvered elements adapted to transmit half of the light energy and reflect the remainder of the light energy 90° with respect to the original direction of the light energy.

5. The optics module of claim 1, 2, 3, or 4, wherein an optical filter is disposed in each ray path intermediate the beam splitter arrangement and the respective vidicon tubes, each filter being selected such that only light within a predetermined range of wavelengths passes therethrough.

* * * * *

UNITED STATES PATENT AND TRADEMARK OFFICE
CERTIFICATE OF CORRECTION

PATENT NO. : 4,302,769
DATED : November 24, 1981
INVENTOR(S) : Louis L. Andry and Michael C. Hoover It is certified that error appears in the above-identified patent and that said Letters Patent are hereby corrected as shown below:

Col. 6, Line 40 - "form" should read -- from --.

Signed and Sealed this

Twenty-third Day of March 1982

|SEAL|

Attest:

GERALD J. MOSSINGHOFF

Attesting Officer

Commissioner of Patents and Trademarks